United States Patent [19]

Swartz

[11] 4,407,833

[45] Oct. 4, 1983

[54] WHEY PROTEIN FORTIFIED RED MEAT AND PROCESS FOR PREPARATION

[75] Inventor: William E. Swartz, Upper St. Clair, Pa.

[73] Assignee: Nutrisearch Company, Cincinnati, Ohio

[21] Appl. No.: 416,695

[22] Filed: Sep. 10, 1982

Related U.S. Application Data

[63] Continuation of Ser. No. 224,717, Jan. 13, 1981, abandoned, which is a continuation-in-part of Ser. No. 108,441, Dec. 31, 1979, abandoned.

[51] Int. Cl.³ .............................................. A23L 1/31
[52] U.S. Cl. .................................. 426/281; 426/641; 426/652; 426/657
[58] Field of Search ............... 426/583, 641, 645, 647, 426/656, 657, 646, 652, 802, 281

[56] References Cited

U.S. PATENT DOCUMENTS

| | | | |
|---|---|---|---|
| Re. 30,023 | 6/1979 | Hawley et al. | 426/643 X |
| 2,442,663 | 6/1948 | Rinehart . | |
| 2,957,770 | 10/1960 | Freund et al. . | |
| 3,235,386 | 2/1966 | Mykleby . | |
| 3,269,843 | 8/1966 | McKee et al. . | |
| 3,573,063 | 3/1971 | Williams . | |
| 3,930,056 | 12/1975 | Feminella et al. | 426/646 |
| 3,989,851 | 11/1976 | Hawley et al. | 426/643 X |
| 4,075,357 | 2/1978 | Szczesniak et al. | 426/641 X |
| 4,132,809 | 1/1979 | DesRosier | 426/583 X |
| 4,161,552 | 7/1979 | Melachouris | 426/583 X |
| 4,164,589 | 8/1979 | Kadane et al. | 426/652 X |
| 4,168,322 | 9/1979 | Buckley et al. | 426/641 X |
| 4,259,363 | 3/1981 | Lauck et al. | 426/583 X |

FOREIGN PATENT DOCUMENTS

| | | |
|---|---|---|
| 1266622 | 4/1968 | Fed. Rep. of Germany . |
| 2088367 | 1/1972 | France . |
| 6705069 | 10/1968 | Netherlands . |

OTHER PUBLICATIONS

Webb et al., *Byproducts From Milk*, 2nd ed., 1970, p. 104.
Durand et al., "The Detection of Casein in Brines Injected into Cooled Hams", Rec. Med. Vit. 147 (8), 1971, pp. 853–858.
Hermasson et al., "Functional Properties of Added Proteins Correlated With Properties of Meat Systems", *Journal of Food Science*, vol. 40, 1975, pp. 595–614.
Chem. Abstracts: 64, 1262f, (1966); 71, 122535q, (1969); 75, 87517b, (1971); 81,48664u & 48668y, (1974); 84, 88153v, (1976).
Chem. Abstracts: 85, 4007k, (1976); 85, 107596f, (1976); 86, 41864d, (1976); 81, 118697h, (1974); 82, 71745a, (1975).
Leistner, *German Sausage*, Diefleischwirtschaft Nr., 6/1978.
*ENRPRO 50 Whey Protein Concentrate*, Stauffer Chemical Co., 6/79, pp. 1–3.
*Whey Proteins & Modern Food Pressing*, Stauffer Chemical Co., 6/77, pp. 1–26.
"Dairy–Based Ingredients–Their Expanding Role in Non–Dairy Processed Foods", *Food Processing*, 10/77, pp. 40–43.
Lavck, "the Functionality of Binders in Meat Emulsions", *Journal of Food Science*, 40, (1975), pp. 736–740.

*Primary Examiner*—Arthur L. Corbin
*Attorney, Agent, or Firm*—Cushman, Darby & Cushman

[57] ABSTRACT

Protein fortified red meat comprising intact natural skeletal meat having incorporated therein a whey protein fortifier composition having more than about 30% by weight whey protein on a dry solids basis and process for the preparation thereof.

9 Claims, No Drawings

WHEY PROTEIN FORTIFIED RED MEAT AND PROCESS FOR PREPARATION

This is a continuation, of application Ser. No. 224,717 filed Jan. 13, 1981 now abandoned, which in turn is a continuation-in-part of earlier application Ser. No. 108,441, filed Dec. 31, 1979, now abandoned.

The present invention relates to protein fortification of red meat.

Red meats such as beef, pork, veal, lamb or mutton in the non-comminuted form are utilized extensively in the American diet as a protein source. However, the quantities per consumer have in recent years been lower and the cost of producing a pound of red meat has increased significantly, thus causing a general overall increase in the price of fresh, red meat. Attempts have been made to solve the problem of the availability and high cost of red meats by the introduction of solid protein extenders for use with comminuted meats such as beef. This type of system has not received large scale acceptance due to the flavor problems which naturally are attendant with the soy bean, i.e., the beany flavor. The use of soy isolate as an extender in cured meats such as ham has been advocated in U.S. Pat. No. 3,989,851. Various references are known for treating fresh raw meat with milk proteins as binding agents. However, little work has been done in the field of extending fresh, red meat with high quality protein to avoid the cost and availability problems presently attendant in the market place. The price of meat is such that it is now economically feasible to attempt such extension.

THE INVENTION

In accordance with the present invention, red meat in a non-comminuted, uncured, intact form can be extended without affecting the flavor, color, appearance or texture thereof by incorporating into the meat a whey protein fortifier solution. This invention is particularly applicable to those products which are formed from large pieces of meat termed "sectioned and formed".

DETAILED DESCRIPTION OF THE PRESENT INVENTION

As used herein, the term "intact red meat" is intended to mean that the meat is in a state recognizable as meat muscle tissue. Thus, the meat muscle tissue and muscle fiber bundles which make up the meat are as in the natural animal. Intact is not intended to include comminuted meats where the muscle tissue has been so reduced in size as to destroy the integrity of the muscle fiber bundles. Intact meat is also intended to cover pieces of meat which have been reduced in size from that of the original source to a size wherein the reduction has not been such that the muscle fiber bundles have been destroyed and wherein the size is sufficiently larger to allow incorporation of the protein fortifier. Generally, meat reduced to a particle size wherein the smallest of any dimension of the particle (length, width, depth, or diameter) is $\frac{3}{8}$" or above is usable in the invention.

As used herein, the term "incorporation" is intended to mean inserting the whey protein fortifier composition into the muscle tissue in the natural fiber bundle spaces.

The red meats to be treated in accordance with the present invention include beef, pork, veal, lamb or mutton, as well as wild meat such as venison and preferably beef or pork and more preferably, beef. These meats can be treated immediately after slaughter or at a later date. The age of the meat is not critical.

The protein extender used in the present invention comprises 75–100% of a whey protein concentrate and from about 25–0% of another protein containing source. The protein must be hydratable so that it can be incorporated (injected) into the raw meat. The whey protein concentrate is required to have a minimum of about 30% by weight whey protein on a dry solids basis with the remainder of the composition being lactose and ash. The optional protein source can be either animal or vegetable and can be derived from dairy sources such as milk or whey, or vegetables sources such as soy. When using soy protein as the optional protein source, care must be taken to insure that the protein is properly hydrated. Limited amounts of soy protein should be used to avoid a beany taste.

The whey protein concentrate used in the present invention can be derived from either acid whey or sweet whey as desired. Acid whey is the byproduct obtained from the acid coagulation of milk protein by the use of a lactic acid producing bacteria (e.g., lactobacillus) or by the addition of food grade acids such as lactic or hydrochloric acid, i.e., by direct acidification. In either case, acidification is allowed to proceed until a pH of approximately 4.6 is reached. At this pH, casein becomes insolubilized and coagulates as cheese curd. The cheese commonly produced by this method is called "cottage cheese". The whey obtained as a byproduct from this method is commonly called "acid" or "cottage cheese whey".

The whey can also be derived from the production of cheddar cheese which is commonly produced by the rennet coagulation of protein. This cheese whey is commonly called "sweet" or "cheddar cheese whey". Whey derived from other cheese manufacturing processes can also be used.

The whey protein concentrate as used in the present invention is most preferably derived from 100% acid cheese whey though minor amounts of other cheese wheys of up to 50% and preferably less than 20% can be used in the preferred form.

The whey protein concentrate must be hydratable or dispersible to the extent of forming an injectable solution. As used herein, the term "hydratable" is intended to include injectable dispersions. Otherwise, the material cannot be incorporated (injected) into the meat. Processes which can be utilized to prepare whey protein concentrates in a hydratable form include electrodialysis (Stribley, R.C., Food Processing, Volume 24, No. 1, p. 49, 1963), Reverse Osmosis, Marshall, P. G. et al., Fractionation and Concentration of Whey by Reverse Osmosis, Food Technology 22(a) 696, 1968, Gel Filtration (U.S. Pat. No. Re. 27,806), or Ultrafiltration, Horton, B. S. et al., Food Technology, Volume 26, p. 30, 1972. Chemical methods such as phosphate precipitation as described in Gordon U.S. Pat. No. 2,388,624 and Melachouris U.S. Pat. No. 4,043,990 can be used if the products obtained from those chemical precipitation methods are hydratable.

It has been found that the most effective results have been obtained using an ultrafiltered acid (cottage cheese) whey protein concentrate containing at least about 40% whey protein. In a typical process, cottage cheese whey is neutralized to a pH of about 6.4 with 50% caustic. After storage, the pH is then adjusted to about 7.2 and any solids or precipitates are removed by centrifugal clarification. The clarified liquor is then pasteurized. The liquor is then fed into an ultrafiltration membrane unit. The retentate is condensed and spray dried. Protein products of 35% or more whey protein can be prepared by this process. One of the more preferred products prepared by this process generally comprises from about 40% to about 60% protein based on total Kjeldahl nitrogen, 10–30% lactose, 3–15% ash and 0.1–4% fat. It is preferred to use a product in the dry form to avoid the need for refrigeration though the liquid whey protein concentrate can also be used if desired. As used herein, the term "whey protein concentrate" is also intended to include any of the products prepared by other methods which have a whey protein concentration of at least 30% on a dry solids basis and which composition is hydratable under the conditions of the meat treatment. It is required that the protein be substantially undenatured or that the lactose salts or any other material in the composition not cause any dissolution problems.

In addition to the whey protein concentrate, the fortifier composition can also contain from about 25% to about 0% of another protein containing composition preferably based on dairy products such as NFDM, dried whey, delactosed whey, delactosed demineralized whey where demineralization is accomplished by any known method such as electrodialysis.

The whey protein fortifier composition can be dissolved in water and the solution used as is or as a vehicle for adding other flavoring agents to the raw meat, such as salt, pepper, spices, herbs and the like, flavor enhancers and other such ingredients. Gelling agents such as gelatin or other ingredients can be added in this manner.

The red meats which can be fortified in accordance with the present invention include pork-derived meats such as pork loins and pork roasts, beef-derived meats such as sirloin, round, brisket, chuck, rump and the like.

The protein fortifier solution can be incorporated in the meat, i.e., inserted in the muscle tissue in the natural fiber bundle spaces, by any known means for that purpose. The incorporation is intended to be substantially throughout the meat. Methods for such incorporation include artery and vein pumping, injection, stitch pumping, osmosis (with or without pumping), topical high pressure injection, absorption in combination with massaging, and combinations thereof. The preferred incorporation methods include stitch pumping, vein or artery pumping, injection or combinations thereof. The technique utilized will be governed by the meat and the desires of the processor. The meat is preferably massaged or tumbled after pumping, optionally in the presence of additional protein fortifiers or cure solution, to insure even distribution of the fortification solution. The fortifier can be applied to whole sides or small portions, boned or unboned, such as rump roasts, though injection into small pieces is preferably to allow for massaging.

The protein fortifier solution should contain a sufficient amount of protein to allow for convenient application. Fortifier solutions containing in excess of 17% protein are not preferred as they tend to clog injection systems. Injection solutions containing from about 7% to about 14% protein are preferred. It is preferred that the protein fortifier composition be used in an amount sufficient to supplement the protein content of the red meat at least about 1% on a dry weight basis, the percentage being based on the weight of the final fortified product. It is also preferred to add sufficient protein to supplement the protein content of the green meat by at least about 10%. The upper limit is dictated by the amount that the meat can hold. It is more preferred to add sufficient protein so that the finished meat product will contain at least 90% of the protein concentration of the untreated meat and in an amount sufficient to provide the proper moisture to protein ratio.

The protein fortified meat can be sold in the raw state or cooked and sold in such forms as luncheon meat, or as a sectioned and formed product. A sectioned and formed product is generally prepared by blending intact sections of meat with from about 10% to 25% by weight of the total meat of comminuted meat. The sections of meat can be impregnated with protein fortifier or the final product can be injected. The comminuted portion can be prepared from impregnated meat or ground with or without protein fortifier. The comminuted portion (emulsion) along with appropriate seasonings, water and if desired, protein fortifier, is blended with the sections and mass stuffed into suitable casings (10–15 centimeters diameter). This product can be marketed as such, fresh, frozen or heat processed and marketed as cooked meat.

The invention will be more fully illustrated in the examples which follow.

EXAMPLE 1

A solution comprising 25% whey protein concentrate (50% whey protein prepared by ultrafiltration of acid whey) and 75% water and small quantities of seasoning is injected into trimmed bottom round of beef using a multiple needle stitch pump. Samples are prepared using pumps ranging from 10% to 50% green weight at 10% increase intervals. Effective results are obtained at 30% pump.

The pumped product is vacuum-packed and sealed in impermeable packaging for sale. Other samples which can be sold as roasted or cooked are oven roasted, steam-cooked and water-cooked.

EXAMPLE 2

Sections of beef smaller than about 10 centimeters are injected with protein fortifier as in Example 1. 15% of these sections are chopped in a silent cutter along with salt, seasoning, water and whey protein fortifier in amounts sufficient to form an emulsion. This emulsion is then thoroughly mixed with the remainder of the meat sections and stuffed into casings having a diameter of between 10 and 15 centimeters. After cooking, the product, a roast beef-whey roll, is ready for sale.

What is claimed is:

1. Protein fortified red meat, comprising intact natural skeletal meat as the sole meat source, having incorporated in the muscle tissue of said red meat a whey protein fortifier composition having more than about 30% by weight whey protein on a dry solids basis wherein said whey protein fortifier composition consists essentially of from about 75% to about 100% of a whey protein concentrate as the sole protein source, wherein said whey protein concentrate is prepared by neutralizing whey prior to protein concentration thereof and wherein said whey protein fortifier composition is hydratable for incorporation into said meat.

2. The protein fortified red meat as recited in claim 1 wherein said fortifier composition is used in an amount sufficient to supplement the protein content of the red meat at least about 1%.

3. The protein fortified red meat as recited in claim 1 wherein said whey protein fortifier composition is a whey protein concentrate having from about 40% to about 60% by weight protein.

4. The protein fortified red meat as recited in claim 1 wherein said intact red meat is beef or pork.

5. The protein fortified red meat as recited in claim 1 in the shape of a sectioned and formed product.

6. A method for protein fortifying intact red meat comprising incorporating into the muscle tissue of said intact red meat, as the sole meat source, a hydrated whey protein concentrate based protein extender consisting essentially of about 100% whey protein concentrate as the sole protein source, wherein said whey protein concentrate is prepared by neutralizing the whey prior to protein concentration thereof, and wherein said whey protein concentrate has more than 30% by weight whey protein on a dry solids basis.

7. The method as recited in claim 6 wherein said intact red meat is beef or pork.

8. The method as recited in claim 6 wherein the protein fortified intact red meat is in the shape of a sectioned and formed product.

9. The method of claim 6 wherein said incorporating is accomplished by a method selected from the group consisting of stitch pumping, vein pumping, artery pumping, injection and combinations thereof.

* * * * *